United States Patent
Namou et al.

(10) Patent No.: US 10,044,209 B2
(45) Date of Patent: Aug. 7, 2018

(54) METHOD AND APPARATUS FOR CHARGING A HIGH-VOLTAGE BATTERY ASSEMBLY

(71) Applicant: GM GLOBAL TECHNOLOGY OPERATIONS LLC, Detroit, MI (US)

(72) Inventors: Andrew J. Namou, West Bloomfield, MI (US); Helen X. Qin, Sterling Heights, MI (US); Cotrina C. Connolly, White Lake, MI (US); Paul Stephen Zombory, Northville, MI (US); Aniket P. Kothari, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 14/955,643

(22) Filed: Dec. 1, 2015

(65) Prior Publication Data

US 2017/0155266 A1 Jun. 1, 2017

(51) Int. Cl.
*H02J 7/00* (2006.01)
*H01M 10/00* (2006.01)
*H02J 7/02* (2016.01)
*H02J 7/08* (2006.01)

(52) U.S. Cl.
CPC ........... *H02J 7/0057* (2013.01); *H01M 10/00* (2013.01); *H02J 7/007* (2013.01); *H02J 7/0052* (2013.01); *H02J 7/022* (2013.01); *H02J 7/085* (2013.01); *H02J 2007/0059* (2013.01)

(58) Field of Classification Search
CPC ............. Y02T 10/7005; Y02T 10/7077; Y02T 10/7061; Y02T 90/127; Y02T 10/7088; Y02T 90/12; B60L 11/1811; B60L 2200/26; B60L 11/1809; B60L 11/1851; B60L 11/1803; B60L 7/14; B60L 2210/10; H02J 9/02
USPC .................................................. 320/160–167
See application file for complete search history.

(56) References Cited

U.S. PATENT DOCUMENTS

| 2013/0169039 A1* | 7/2013 | Zhu ..................... H02M 3/1584 307/10.1 |
| 2013/0234669 A1* | 9/2013 | Huang .................. H02J 7/0029 320/126 |
| 2014/0252849 A1* | 9/2014 | Rao ........................ B60R 16/02 307/10.1 |

* cited by examiner

*Primary Examiner* — Binh Tat
(74) *Attorney, Agent, or Firm* — Quinn IP Law

(57) ABSTRACT

A high-voltage battery assembly includes a high-voltage battery electrically connected to a high-voltage bus including a positive rail and a negative rail, wherein the negative rail includes a controllable contactor switch. A boost charging module includes a DC-DC boost converter, a low-voltage power input line, a boost switch and a boost controller. The DC-DC boost converter is electrically connected to the low-voltage power input line via activation of the boost switch. The DC-DC boost converter connects to the positive rail. A low-voltage electrical connector is electrically connected to the low-voltage power input line of the DC-DC boost converter. The boost controller detects low-voltage power from the low-voltage electrical connector, detects that the controllable contactor switch, closes the boost switch, and controls the DC-DC boost converter to convert the low-voltage power on the low-voltage power input line to high-voltage power to charge the high-voltage battery.

12 Claims, 6 Drawing Sheets

METHOD AND APPARATUS FOR CHARGING A HIGH-VOLTAGE BATTERY ASSEMBLY

TECHNICAL FIELD

This disclosure relates to electrical energy storage devices employed on vehicles.

BACKGROUND

Ground vehicles employ electric energy storage devices, including both low-voltage devices, e.g., lead-acid batteries, and high-voltage devices, e.g., lithium-ion devices. The low-voltage energy storage devices may be employed to supply electric power for engine starting and low-voltage electrical loads, e.g., lighting, HVAC, infotainment and other on-vehicle loads. The high-voltage energy storage devices may be employed to supply electric power to electric motor/generators for vehicle propulsion and tractive effort. Vehicle owners are known to park and store vehicles for extended periods of time, e.g., for winter-related storage. On-board parasitic loads may reduce charge state of the low-voltage energy storage devices and the high-voltage energy storage devices.

SUMMARY

A high-voltage battery assembly for a hybrid vehicle is described, and includes a high-voltage battery electrically connected to a high-voltage bus including a positive rail and a negative rail, wherein the negative rail includes a controllable contactor switch. A boost charging module electrically connects across the high-voltage bus and includes a DC-DC boost converter, a low-voltage power input line, a boost switch and a boost controller. The DC-DC boost converter is electrically connected to the low-voltage power input line via activation of the boost switch. The DC-DC boost converter includes an electric power output line, and the electric power output line is electrically connected to the positive rail of the high-voltage bus. A low-voltage electrical connector is electrically connected to the low-voltage power input line of the DC-DC boost converter. The boost controller includes an instruction set that is executable to detect low-voltage power on the low-voltage power input line from the low-voltage electrical connector, detect that the controllable contactor switch of the negative rail is in an open state, close the boost switch, and control the DC-DC boost converter to convert the low-voltage power on the low-voltage power input line to high-voltage power to charge the high-voltage battery.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
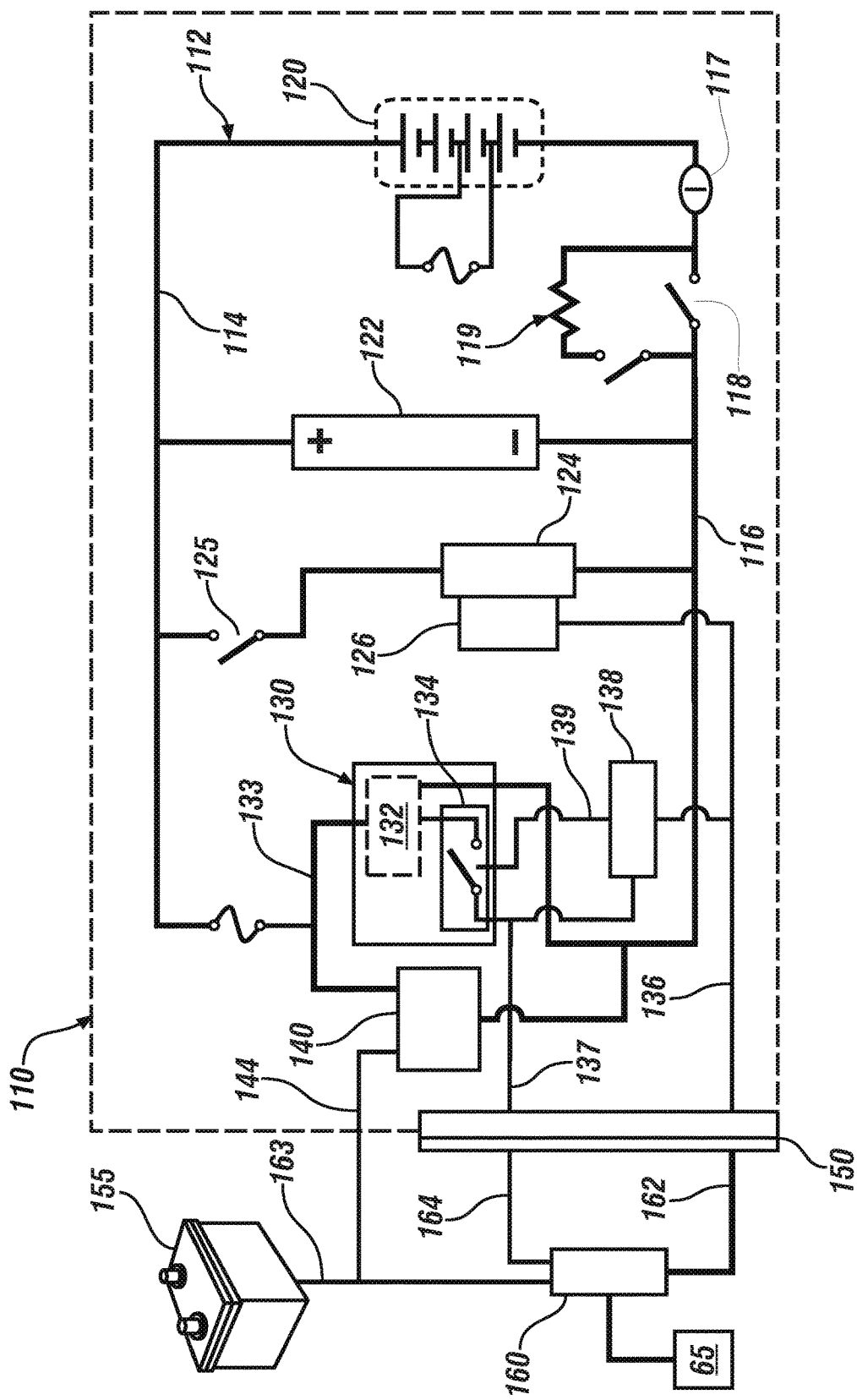
FIG. 1 schematically illustrates an embodiment of a high-voltage (HV) battery assembly including a HV battery that may be electrically charged employing an off-board low-power AC/DC power adapter, in accordance with the disclosure.

Referring now to the drawings, wherein the depictions are for the purpose of illustrating certain exemplary embodiments only and not for the purpose of limiting the same, FIG. 1 schematically illustrates an embodiment of a high-voltage battery assembly 110 including a HV battery 120 that may be electrically charged employing an off-board low-power AC/DC power adapter (AC/DC adapter) 160. The high-voltage battery assembly 110 may be advantageously employed on a hybrid vehicle, an electric vehicle, or another vehicle system that employs high-voltage electrical power. The vehicle may include, by way of non-limiting examples, a passenger vehicle, a light-duty or heavy-duty truck, a utility vehicle, an agricultural vehicle, an industrial/warehouse vehicle, or a recreational off-road vehicle. The high-voltage battery assembly 110 includes a multi-cell high-voltage energy storage device (HV battery) 120 that electrically connects to a high-voltage bus 112 to supply high-voltage DC electric power to a power inverter module 124, a power boost module 130 and an auxiliary power module 140. Like numerals and like terms indicate like or corresponding parts throughout the several views. As employed herein, the term 'line' refers to electrical wire cables, fabricated from copper, aluminum, or another suitable material, that is of sufficient diameter or cross-sectional area to convey electric power.

The HV battery 120 may be any high-voltage electrical energy storage device, e.g., a multi-cell lithium ion device or another suitable device without limitation that employs electrochemical processes to store electrical energy for consumption by operation of the vehicle, and may have a voltage level near 300V DC in certain embodiments. The high-voltage bus 112 includes a positive high-voltage rail (HV+) 114 and a negative high-voltage rail (HV−) 116. The HV− 116 preferably includes a current sensor 117, a negative contactor switch 118 and a pre-charge contactor circuit 119. A voltage sensor 122 may be arranged to monitor the voltage level across HV+ 114 and HV− 116.

The power inverter module 124 electrically connects across HV+ 114 and HV− 116, with a power switch 125 arranged in series. The power inverter module 124 may be configured with suitable control circuits including power transistors, e.g., IGBTs, and is capable of transforming high-voltage DC electric power to high-voltage AC electric power, and transforming high-voltage AC electric power to high-voltage DC electric power in response to pulsewidth-modulating (PWM) control signals generated by an associated controller 126. The high-voltage AC power may be transferred to an electric machine to generate mechanical power for vehicle propulsion in certain embodiments.

The boost module 130 includes a step-up DC/DC electric power converter 132 that converts low-voltage DC electric power to high-voltage DC electric power. The DC/DC converter 132 may employ switched-mode DC/DC conversion technology, magnetic DC/DC conversion technology, linear DC/DC conversion technology, or another suitable DC/DC conversion technology. A controllable boost switch 134 is arranged in series between a first low-voltage power line 137 and an electrical inlet to the boost module 130, and a battery system manager 138 is arranged to control activation of the boost switch 134 via control line 139. The battery system manager 138 is a controller that may be activated by presence of electric power on the first low-voltage power line 137. As such, the first low-voltage power line 137 may be employed as a proximity line, eliminating a need for a separate line for communication to the battery system manager 138.

The battery system manager 138 includes algorithmic code including an instruction set in the form of a low-power charging routine 200 that is executable under specific conditions, such as when the vehicle is in a key-off state. Electric power for operating the battery system manager 138 may be supplied from a second low-voltage power line 136. When the boost switch 134 is closed, i.e., activated by the battery system manager 138, electric power from the first low-voltage power line 137 is input to the boost module 130 via the activated boost switch 134. The DC/DC electric power converter 132 converts the low-voltage DC power from the first low-voltage DC power line 137 to a regulated DC electric power at an increased voltage level that is supplied via line 133 to HV+ 114 to charge the HV battery 120.

The auxiliary power module 140 is a DC/DC step-down electric power converter that converts high-voltage DC electric power to low-voltage DC electric power, e.g., at a regulated 12 V DC voltage level. The high-voltage DC electric power may include the higher voltage, regulated DC electric power that is supplied via line 133 from the boost module 130. The auxiliary power module 140 electrically connects via a third low-voltage power line 144 to supply electric power to an on-vehicle low-voltage battery 155 via line 163 that is external to the high-voltage battery assembly 110.

Preferably, the boost module 130 is co-located with the auxiliary power module 140, and they are arranged electrically in parallel between HV+ 114 and HV− 116. This provides an efficient, low-power device that enables flexibility of overnight charging and/or long term storage protection of the HV battery 120 employing the low-power AC/DC adapter 160.

The low-voltage connector 150 provides external electrical connections to the second low-voltage DC power line 136 and the first low-voltage power line 137 of the high-voltage battery assembly 110. The second low-voltage DC power line 136 of the high-voltage battery assembly 110 electrically connects to line 162 of the low-power AC/DC adapter 160, and the first low-voltage DC power line 137 of the high-voltage battery assembly 110 electrically connects to line 164 of the AC/DC adapter 160.

The low-power AC/DC adapter 160 transforms AC power to DC power that is supplied via lines 162, 163 and 164 to a connector that mates with the low-voltage connector 150. In certain embodiments, the low-power AC/DC adapter 160 transforms 120V AC electric power that is supplied from an electrical outlet 65 to 12V DC electric power. The low-power AC/DC adapter 160 may connect to the low-voltage battery 155 via independent line 163, which may also connect to the third low-voltage power line 144. The 12V DC electric power supplied by the low-power AC/DC adapter 160 may be employed to electrically charge the high-voltage battery assembly 110 via the boost module 130 and also charge the on-vehicle low-voltage battery 155. Low-power AC/DC charging modules are known to those skilled in the art.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. Data signals may include signals representing inputs from sensors, signals representing actuator commands, and communications signals between controllers. The term 'model' refers to a processor-based or processor-executable code and associated calibration that simulates a physical existence of a device or a physical process.

Figure 2:
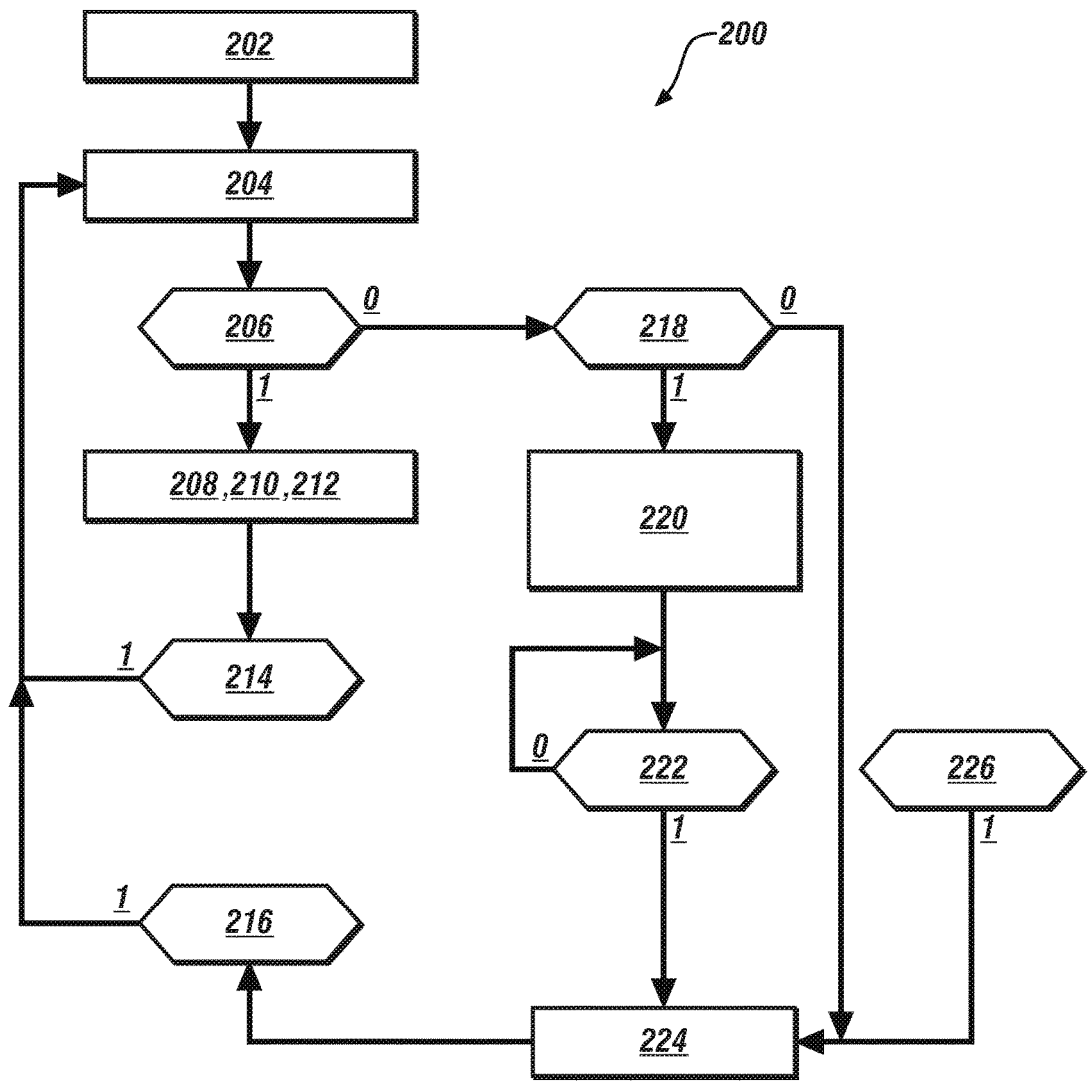
FIG. 2 schematically illustrates an embodiment of a low-power charging routine that may be executed by a battery system manager to effect low-power vehicle-off maintenance charging of an embodiment of the high-voltage battery assembly described with reference to FIG. 1, in accordance with the disclosure.

FIG. 2 schematically shows an embodiment of the low-power charging routine 200, which may reside in and be executed by the battery system manager 138 to effect low-power vehicle-off maintenance charging of an embodiment of the high-voltage battery assembly 110. Preferably, the low-power charging routine 200 employs charging electric power that originates from an off-board AC power source, e.g., an embodiment of the low-power AC/DC adapter 160, which receives AC line power from a stationary power source. The low-power charging routine 200 may be readily incorporated into the system without additional high-voltage switchgear such as voltage, current sensing, and HV fusing to an embodiment of a vehicle that employs an embodiment of the high-voltage battery assembly 110 described hereinabove with reference to FIG. 1. Table 1 is provided as a key wherein the numerically labeled blocks and the corresponding functions are set forth as follows, corresponding to the low-power charging routine 200.

TABLE 1

| BLOCK | BLOCK CONTENTS |
|---|---|
| 202 | Input signal transitions from low voltage to high voltage in response to detection of low-voltage DC electric power at first line |
| 204 | Activate battery system manager |
| 206 | Is Vbat less than threshold? |
| 208 | Set alarm to activate battery system manager after delay |
| 210 | Deactivate battery system manager |
| 212 | Execute 12 V battery maintenance charging |
| 214 | Has time alarm expired? |
| 216 | Has day alarm expired? |
| 218 | Is voltage of high-voltage battery less than threshold SOC? AND are there any detected faults? |
| 220 | Charge HV battery<br>Activate boost switch<br>Command boost module to execute DC/DC conversion<br>Evaluate boost module with current sensor |
| 222 | Is voltage of high-voltage battery greater than threshold SOC? OR are there any detected faults? |
| 224 | Set day alarm<br>Deactivate boost controller |
| 226 | Override? |

The low-power charging routine 200 may initiate execution only when the vehicle is off, as indicated by the negative contactor switch 118 being in an open state and the pre-charge contactor circuit 119 being in an open state. The low-power charging routine 200 initiates execution when an off-board charging device, e.g., the low-power AC/DC adapter 60 is electrically connected to the low-voltage connector 150 to supply low-voltage DC electric power to the high-voltage battery assembly 110 and to the low-voltage battery 155. As such, the low-power charging routine 200 initiates execution when a signal on the first low-voltage power line 137 transitions from a low state to a high state in response to presence of low-voltage DC electric power at the second low-voltage DC power line 136 (202), which activates the battery system manager 138 (204). The signal conveyed through the first low-voltage power line 137 may indicate that the low-power AC/DC adapter 160 has been inserted into the low-voltage connector 150 to effect charging, without a need for other communication to the battery system manager 138. The battery system manager 138 is disposed to monitor the high-voltage battery assembly 110 and the low-voltage battery 155.

When the battery system manager 138 determines that the voltage of the low-voltage battery 155 is less than a minimum voltage threshold (206)(1), the battery system manager 138 sets a time alarm for reactivating, i.e., waking up, after a preset delay time (208), and then deactivates (210). This permits the low-power AC/DC adapter 160 to supply low-voltage DC electric power to the low-voltage battery 155 to effect maintenance charging (212). Elapsed time is monitored (214), and when the preset delay time has expired (214)(1), the battery system manager 138 is re-activated (204) and executes the process steps described herein.

When the battery system manager 138 determines that the voltage of the low-voltage battery 155 is greater than the minimum voltage threshold (206)(0), it monitors inputs from the high-voltage battery assembly 110 that indicate its state-of-charge (SOC) (218).

When the SOC of the high-voltage battery assembly 110 is greater than a low threshold SOC, and no related fault codes have been detected (218)(0), the battery system manager 138 sets a day count alarm for reactivating, i.e., wake up, after a preset quantity of delay days (224), and then deactivates. The quantity of days is monitored (216), and when the day count has expired (216)(1), the battery system manager 138 is re-activated (204).

When the SOC of the high-voltage battery assembly 110 is less than the low threshold SOC, and no related fault codes have been detected (218)(1), the battery system manager 138 begins charging the high-voltage battery assembly 110, which includes activating the boost switch 134 and commanding the boost module 130 to execute DC/DC electric power conversion (220), including monitoring operation of the boost module 130 employing the current sensor 117.

This operation continues, with the battery system manager 138 monitoring the SOC of the high-voltage battery assembly 110 (222). When the SOC of the high-voltage battery assembly 110 is greater than a high threshold SOC (222)(1), the battery system manager 138 sets the day alarm for reactivating, i.e., wakes up, after the preset quantity of delay days (224), and then deactivates.

Figure 3:
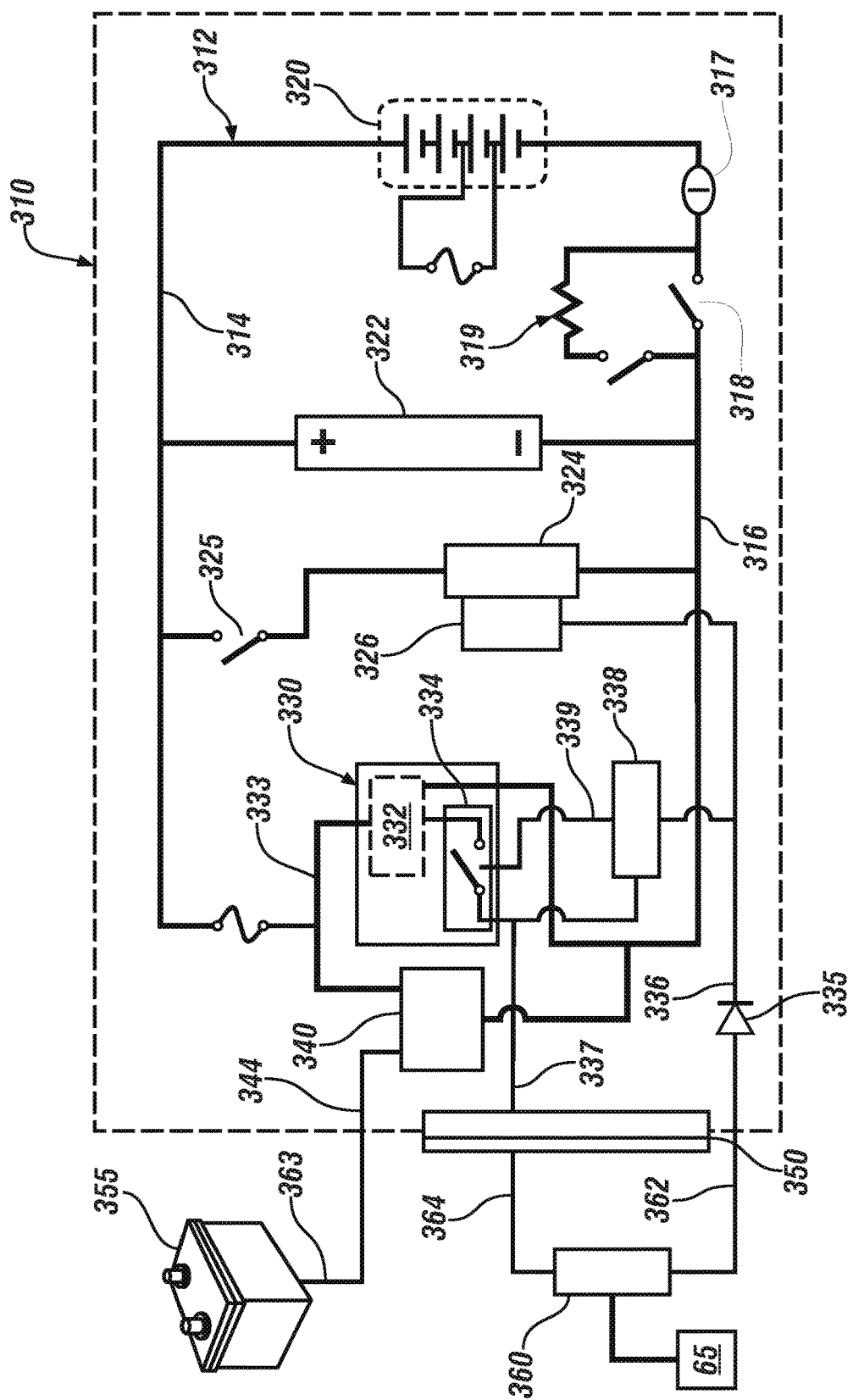
FIGS. 3-6 schematically illustrate additional embodiments of the high-voltage battery assembly including a HV battery that may be electrically charged employing an off-board low-power AC/DC power adapter, in accordance with the disclosure.

FIG. 3 schematically illustrates another embodiment of a high-voltage battery assembly 310 that may be advantageously employed on a hybrid vehicle, an electric vehicle, or another vehicle system that employs high-voltage electrical power. The high-voltage battery assembly 310 includes a multi-cell high-voltage energy storage device (HV battery) 320 that electrically connects to a high-voltage bus 312 to supply high-voltage DC electric power to a power inverter module 324, a power boost module 330 and an auxiliary power module 340. The HV battery 320 may be any high-voltage electrical energy storage device, e.g., a multi-cell lithium ion device or another suitable device without limitation that employs electrochemical processes to store electrical energy for consumption by operation of the vehicle, and may have a voltage level near 300V DC in certain embodiments. The high-voltage bus 312 includes a positive high-voltage rail (HV+) 314 and a negative high-voltage rail (HV−) 316. The HV− 316 preferably includes a current sensor 317, a negative contactor switch 318 and a pre-charge contactor circuit 319. A voltage sensor 322 may be arranged to monitor the voltage level across HV+ 314 and HV− 316. The power inverter module 324, associated controller 326 and power switch 325 are analogous to the power inverter module 124, controller 126 and power switch 125 described with reference to FIG. 1.

The boost module 330 includes a step-up DC/DC electric power converter 332 that converts low-voltage DC electric power to high-voltage DC electric power. The DC/DC converter 332 may employ switched-mode DC/DC conversion technology, magnetic DC/DC conversion technology, linear DC/DC conversion technology, or another suitable DC/DC conversion technology. A controllable boost switch 334 is arranged in series between a first low-voltage power line 337 and an electrical inlet to the boost module 330, and a battery system manager 338 is arranged to control activation of the boost switch 334 via control line 339. The battery system manager 338 is a controller that may be activated by the presence of electric power on the first low-voltage power line 337. As such, the first low-voltage power line 337 may be employed as a proximity line, eliminating a need for a separate line for communication to the battery system manager 338.

The battery system manager 338 includes algorithmic code including an instruction set in the form of a low-power charging routine 200 that is executable under specific conditions, such as when the vehicle is in a key-off state. Electric power for operating the battery system manager 338 may be supplied from a second low-voltage power line 336. When the boost switch 334 is closed, i.e., activated by the battery system manager 338, electric power from the first low-voltage power line 337 is input to the boost module 330 via the activated boost switch 334. The DC/DC electric power converter 332 converts the low-voltage DC power from the first low-voltage DC power line 337 to a regulated DC electric power at an increased voltage level that is supplied via line 333 to HV+ 314 to charge the HV battery 320.

The auxiliary power module 340 is a DC/DC step-down electric power converter that converts high-voltage DC electric power to low-voltage DC electric power, e.g., at a regulated 12 V DC voltage level. The high-voltage DC electric power may include the higher voltage, regulated DC electric power that is supplied via line 333 from the boost module 330. The auxiliary power module 340 electrically connects via a third low-voltage power line 344 to supply electric power to an on-vehicle low-voltage battery 355 that is external to the high-voltage battery assembly 310. The auxiliary power module 340 is preferably a one-directional DC/DC converter, i.e., electric power only flows from high-voltage DC electric power to low-voltage DC electric power.

Preferably, the boost module 330 is co-located with the auxiliary power module 340, and they are arranged electrically in parallel between HV+ 314 and HV− 316.

The low-voltage connector 350 provides external electrical connections to the second low-voltage DC power line 336 and the first low-voltage power line 337 of the high-voltage battery assembly 310. The first low-voltage DC power line 337 of the high-voltage battery assembly 310 electrically connects to line 364 of a low-power AC/DC adapter 360. The second low-voltage DC power line 336 of the high-voltage battery assembly 310 electrically connects to line 362 of the AC/DC adapter 360, with an intervening diode 335 that is arranged to prohibit electric power flow from the high-voltage battery assembly 310 to the low-power AC/DC adapter 360.

The low-power AC/DC adapter 360 transforms AC power to DC power that is supplied via lines 362, 363 and 364 to a connector that mates with the low-voltage connector 350. In certain embodiments, the low-power AC/DC adapter 360 transforms 120V AC electric power that is supplied from an electrical outlet 65 to 12V DC electric power. The low-power AC/DC adapter 360 may connect to the low-voltage battery 355 via independent line 363, which may also connect to the third low-voltage power line 344. The 12V DC electric power supplied by the low-power AC/DC adapter 360 may be employed to electrically charge the high-voltage battery assembly 310 via the boost module 330 and also charge the on-vehicle low-voltage battery 355. This arrangement permits parallel low-voltage charging of the HV battery 320 and the low-voltage battery 355.

Figure 4:
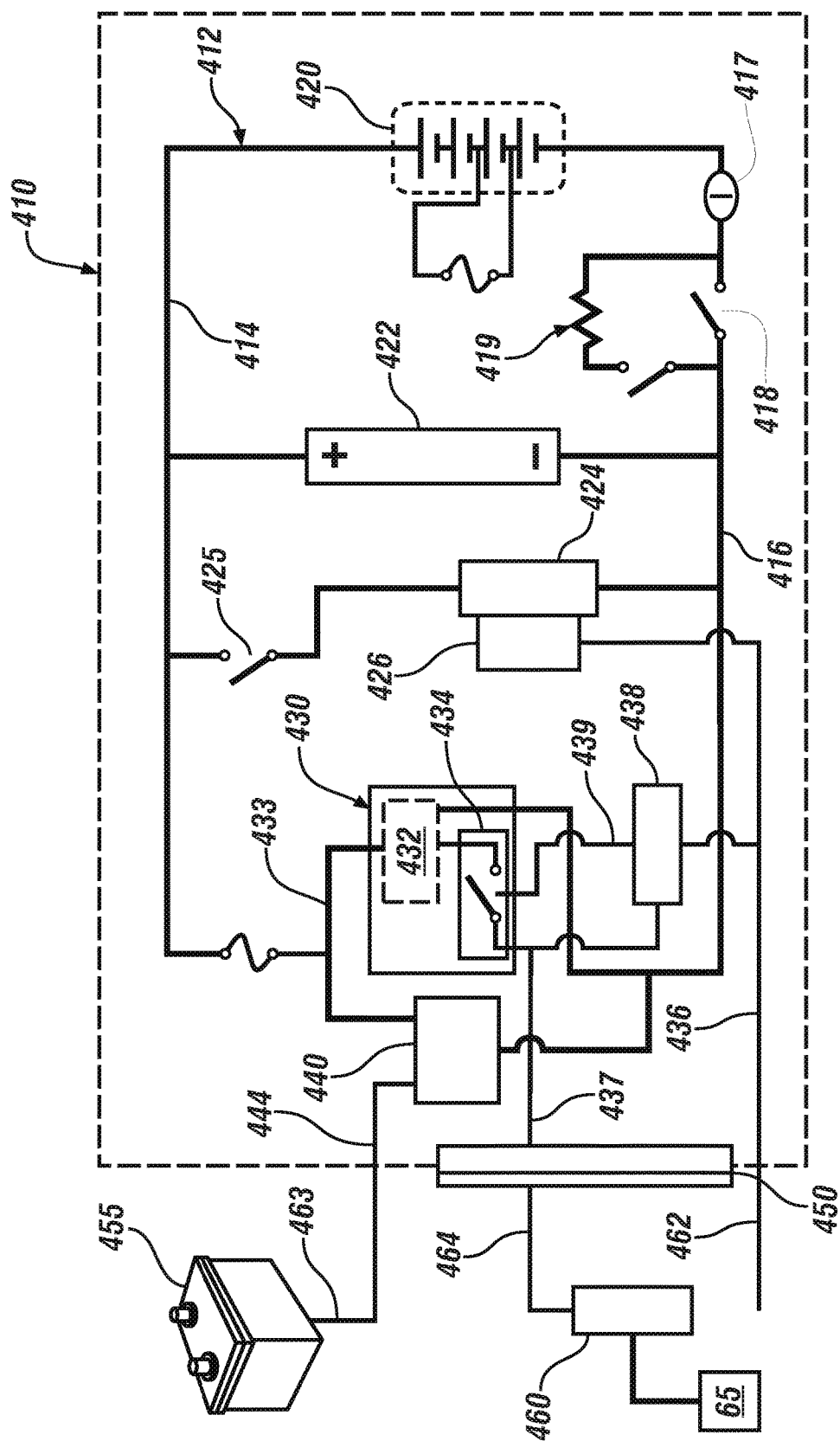

FIG. 4 schematically illustrates another embodiment of a high-voltage battery assembly 410 that may be advantageously employed on a hybrid vehicle, an electric vehicle, or another vehicle system that employs high-voltage electrical power. The high-voltage battery assembly 410 includes a multi-cell high-voltage energy storage device (HV battery) 420 that electrically connects to a high-voltage bus 412 to supply high-voltage DC electric power to a power inverter module 424, a power boost module 430 and an auxiliary power module 440. The HV battery 420 may be any high-voltage electrical energy storage device, e.g., a multi-cell lithium ion device or another suitable device without limitation that employs electrochemical processes to store electrical energy for consumption by operation of the vehicle, and may have a voltage level near 300V DC in certain embodiments. The high-voltage bus 412 includes a positive high-voltage rail (HV+) 414 and a negative high-voltage rail (HV−) 416. The HV− 416 preferably includes a current sensor 417, a negative contactor switch 418 and a pre-charge contactor circuit 419. A voltage sensor 422 may be arranged to monitor the voltage level across HV+ 414 and HV− 416. The power inverter module 424, associated controller 426 and power switch 425 are analogous to the power inverter module 124, controller 126 and power switch 125 described with reference to FIG. 1.

The boost module 430 includes a step-up DC/DC electric power converter 432 that converts low-voltage DC electric power to high-voltage DC electric power. The DC/DC converter 432 may employ switched-mode DC/DC conversion technology, magnetic DC/DC conversion technology, linear DC/DC conversion technology, or another suitable DC/DC conversion technology. A controllable boost switch 434 is arranged in series between a first low-voltage power line 437 and an electrical inlet to the boost module 430, and a battery system manager 438 is arranged to control activation of the boost switch 434 via control line 439. The battery system manager 438 is a controller that may be activated by the presence of electric power on the second low-voltage power line 436.

The battery system manager 438 includes algorithmic code including an instruction set in the form of the low-power charging routine 200 that is executable under specific conditions, such as when the vehicle is in a key-off state. Electric power for operating the battery system manager 438 may be supplied from the second low-voltage power line 436. When the boost switch 434 is closed, i.e., activated by the battery system manager 438, electric power from the first low-voltage power line 437 is input to the boost module 430 via the activated boost switch 434. The DC/DC electric power converter 432 converts the low-voltage DC power from the first low-voltage DC power line 437 to a regulated DC electric power at an increased voltage level that is supplied via line 433 to HV+ 414 to charge the HV battery 420.

The auxiliary power module 440 is a DC/DC step-down electric power converter that is analogous to the auxiliary power module 140 described with reference to FIG. 1. The auxiliary power module 440 electrically connects via a third low-voltage power line 444 to supply electric power to an output line 463, which may be connected to an on-vehicle low-voltage battery 455 that is external to the high-voltage battery assembly 410. The auxiliary power module 440 is preferably a one-directional DC/DC converter, i.e., electric power only flows from high-voltage DC electric power to low-voltage DC electric power. Preferably, the boost module 430 is co-located with the auxiliary power module 440, and they are arranged electrically in parallel between HV+ 414 and HV− 416.

The low-voltage connector 450 provides an external electrical connection to the first low-voltage power line 437 of the high-voltage battery assembly 410. The first low-voltage DC power line 437 of the high-voltage battery assembly 410 electrically connects to line 464 of a low-power AC/DC adapter 460. An internal low-voltage battery (not shown) connects via line 462 to the second low-voltage DC power line 436 of the high-voltage battery assembly 410 to supply electrical power for operating the battery system manager 438. In this embodiment, low-voltage connector 450 may be through a cigarette lighter outlet in the passenger compartment.

The low-power AC/DC adapter 460 transforms AC power to DC power that is supplied via line 464 to a connector that mates with the low-voltage connector 450. In certain embodiments, the low-power AC/DC adapter 460 transforms 120V AC electric power that is supplied from an electrical outlet 65 to 12V DC electric power. The 12V DC electric power supplied by the low-power AC/DC adapter 460 may be employed to electrically charge the high-voltage battery assembly 410 via the boost module 430 and also charge the on-vehicle low-voltage battery 455 when the power line 444 is connected to the low-voltage battery 455.

Figure 5:
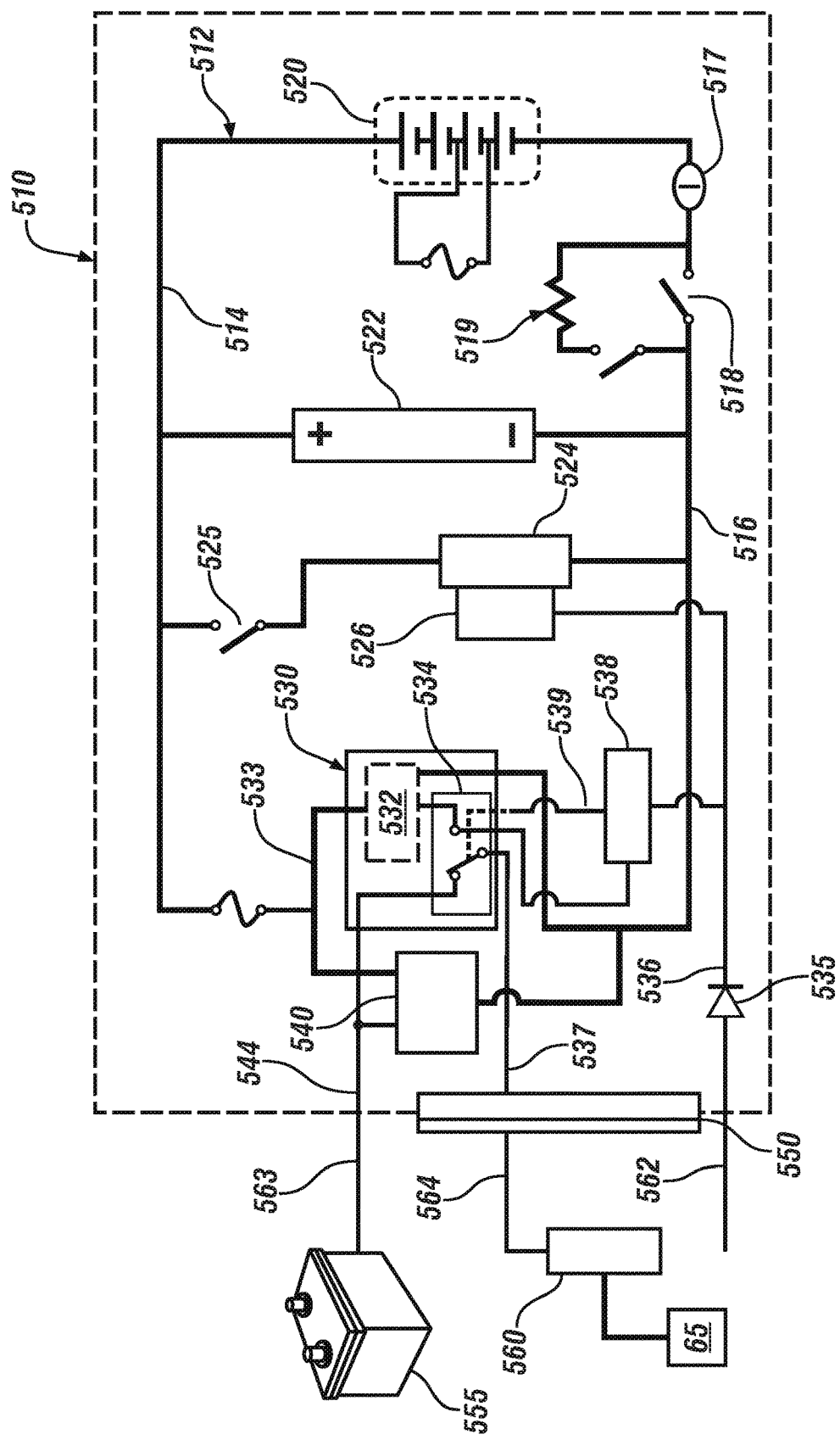

FIG. 5 schematically illustrates another embodiment of a high-voltage battery assembly 510 that may be advantageously employed on a hybrid vehicle, an electric vehicle, or another vehicle system that employs high-voltage electrical power. The high-voltage battery assembly 510 includes a multi-cell high-voltage energy storage device (HV battery) 520 that electrically connects to a high-voltage bus 512 to supply high-voltage DC electric power to a power inverter module 524, a power boost module 530 and an auxiliary power module 540. The HV battery 520 may be any high-voltage electrical energy storage device, e.g., a multi-cell lithium ion device or another suitable device without limitation that employs electrochemical processes to store electrical energy for consumption by operation of the vehicle, and may have a voltage level near 300V DC in certain embodiments. The high-voltage bus 512 includes a positive high-voltage rail (HV+) 514 and a negative high-voltage rail (HV−) 516. The HV− 516 preferably includes a current sensor 517, a negative contactor switch 518 and a pre-charge contactor circuit 519. A voltage sensor 522 may be arranged to monitor the voltage level across HV+ 514 and HV− 516. The power inverter module 524, associated controller 526 and power switch 525 are analogous to the power inverter module 124, controller 126 and power switch 125 described with reference to FIG. 1.

The boost module 530 includes a step-up DC/DC electric power converter 532 that converts low-voltage DC electric power to high-voltage DC electric power. The DC/DC converter 532 may employ switched-mode DC/DC conversion technology, magnetic DC/DC conversion technology, linear DC/DC conversion technology, or another suitable DC/DC conversion technology. A controllable 2-position boost switch 534 is arranged in series between a first low-voltage power line 537 and an electrical inlet to the boost module 530, and between the first low-voltage power line 537 and a third low-voltage power line 544. The third low-voltage power line 544 electrically connects to an external line 563 to supply electric power to another device that is external to the high-voltage battery assembly 510, e.g., an on-vehicle low-voltage battery 555. A battery system manager 538 is arranged to control activation of the boost switch 534 via control line 539, including controlling the boost switch 534 to a first position to supply electric power to the third low-voltage power line 544, and controlling the boost switch 534 to a second position to supply electric power to the DC/DC electric power converter 532. The battery system manager 538 is a controller that may be activated by the presence of electric power on the first low-voltage power line 537. As such, the first low-voltage power line 537 may be employed as a proximity line, eliminating a need for a separate line for communication to the battery system manager 538.

The battery system manager 538 includes algorithmic code including an instruction set in the form of the low-power charging routine 200 that is executable under specific conditions, such as when the vehicle is in a key-off state. Electric power for operating the battery system manager 538 may be supplied from a second low-voltage power line 536. When the boost switch 534 is closed, i.e., activated by the battery system manager 538, electric power from the first low-voltage power line 537 is input to the boost module 530 via the activated boost switch 534. The DC/DC electric power converter 532 converts the low-voltage DC power from the first low-voltage DC power line 537 to a regulated DC electric power at an increased voltage level that is supplied via line 533 to HV+ 514 to charge the HV battery 520.

The auxiliary power module 540 is a DC/DC step-down electric power converter that converts high-voltage DC electric power to low-voltage DC electric power, e.g., at a regulated 12 V DC voltage level, and is analogous to the auxiliary power module 140 described with reference to FIG. 1. The high-voltage DC electric power may include the higher voltage, regulated DC electric power that is supplied via line 533 from the boost module 530. The auxiliary power module 540 electrically connects via a third low-voltage power line 544 to supply electric power, including supplying electric power to the on-vehicle low-voltage battery 555 that is external to the high-voltage battery assembly 510. The auxiliary power module 540 is preferably a one-directional DC/DC converter, i.e., electric power only flows from high-voltage DC electric power to low-voltage DC electric power. Preferably, the boost module 530 is co-located with the auxiliary power module 540, and they are arranged electrically in parallel between HV+ 514 and HV− 516.

The low-voltage connector 550 provides external electrical connections to the second low-voltage DC power line 536 and the first low-voltage power line 537 of the high-voltage battery assembly 510. The first low-voltage DC power line 537 of the high-voltage battery assembly 510 electrically connects to line 564 of a low-power AC/DC adapter 560. The second low-voltage DC power line 536 of the high-voltage battery assembly 510 electrically connects to line 562, which may be any suitable 12V power source, with an intervening diode 535 that is arranged to prohibit electric power flow from the high-voltage battery assembly 510 to the line 562.

The low-power AC/DC adapter 560 transforms AC power to DC power that is supplied via line 564 to a connector that mates with the low-voltage connector 550. In certain embodiments, the low-power AC/DC adapter 560 transforms 120V AC electric power that is supplied from an electrical outlet 65 to 12V DC electric power. The 12V DC electric power supplied by the low-power AC/DC adapter 560 may be employed to electrically charge the high-voltage battery assembly 510 via the boost module 530 and also charge the on-vehicle low-voltage battery 555. This arrangement permits parallel low-voltage charging of the HV battery 520 and the low-voltage battery 555.

Figure 6:
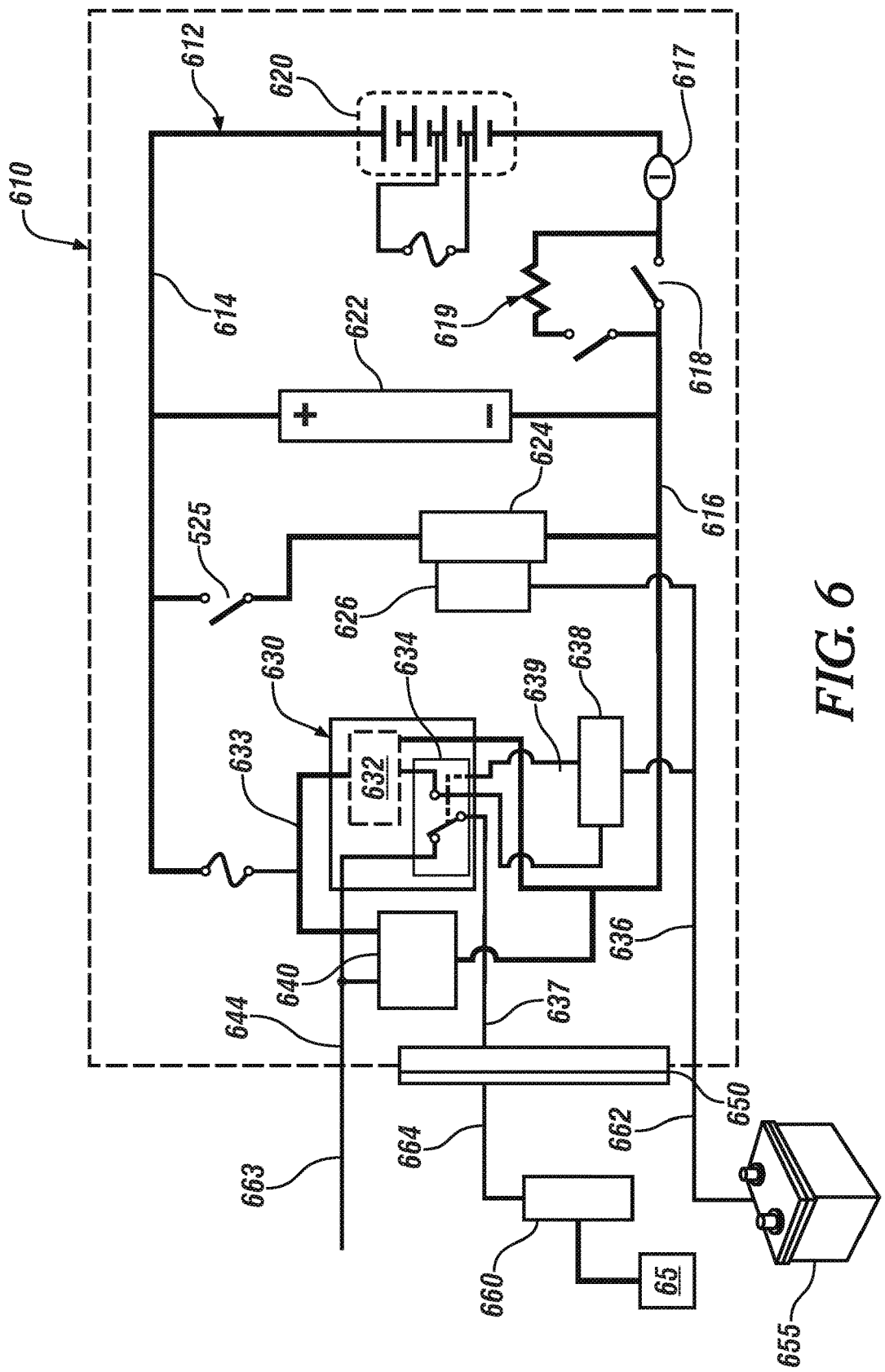

FIG. 6 schematically illustrates another embodiment of a high-voltage battery assembly 610 that may be advantageously employed on a hybrid vehicle, an electric vehicle, or another vehicle system that employs high-voltage electrical power. The high-voltage battery assembly 610 includes a multi-cell high-voltage energy storage device (HV battery) 620 that electrically connects to a high-voltage bus 612 to supply high-voltage DC electric power to a power inverter module 624, a power boost module 630 and an auxiliary power module 640. The HV battery 620 may be any high-voltage electrical energy storage device, e.g., a multi-cell lithium ion device or another suitable device without limitation that employs electrochemical processes to store electrical energy for consumption by operation of the vehicle, and may have a voltage level near 300V DC in certain embodiments. The high-voltage bus 612 includes a positive high-voltage rail (HV+) 614 and a negative high-voltage rail (HV−) 616. The HV− 616 preferably includes a current sensor 617, a negative contactor switch 618 and a pre-charge contactor circuit 619. A voltage sensor 622 may be arranged to monitor the voltage level across HV+ 614 and HV− 616. The power inverter module 624, associated controller 626 and power switch 625 are analogous to the power inverter module 124, controller 126 and power switch 125 described with reference to FIG. 1.

The boost module 630 includes a step-up DC/DC electric power converter 632 that converts low-voltage DC electric power to high-voltage DC electric power. The DC/DC converter 632 may employ switched-mode DC/DC conversion technology, magnetic DC/DC conversion technology, linear DC/DC conversion technology, or another suitable DC/DC conversion technology. A controllable 2-position boost switch 634 is arranged in series between a first low-voltage power line 637 and an electrical inlet to the boost module 630, and between the first low-voltage power line 637 and a third low-voltage power line 644, which may supply electric power to an on-vehicle system. A battery system manager 638 is arranged to control activation of the boost switch 634 via control line 639, including controlling the boost switch 634 to a first position to supply electric power to the third low-voltage power line 644, and controlling the boost switch 634 to a second position to supply electric power to the DC/DC electric power converter 632. The battery system manager 638 is a controller that may be activated by presence of electric power on the second low-voltage power line 636.

The battery system manager 638 includes algorithmic code including an instruction set in the form of the low-power charging routine 200 that is executable under specific conditions, such as when the vehicle is in a key-off state. Electric power for operating the battery system manager 638 may be supplied from a second low-voltage power line 636. When the boost switch 634 is closed, i.e., activated by the battery system manager 638, electric power from the first low-voltage power line 637 is input to the boost module 630 via the activated boost switch 634. The DC/DC electric power converter 632 converts the low-voltage DC power from the first low-voltage DC power line 637 to a regulated DC electric power at an increased voltage level that is supplied via line 633 to HV+ 614 to charge the HV battery 620.

The auxiliary power module 640 is a DC/DC step-down electric power converter that converts high-voltage DC electric power to low-voltage DC electric power, e.g., at a regulated 12 V DC voltage level. The high-voltage DC electric power may include the higher voltage, regulated DC electric power that is supplied via line 633 from the boost module 630. The auxiliary power module 640 electrically connects via the third low-voltage power line 644 to supply electric power to an on-vehicle low-voltage battery 655 that is external to the high-voltage battery assembly 610. The auxiliary power module 640 is preferably a one-directional DC/DC converter, i.e., electric power only flows from high-voltage DC electric power to low-voltage DC electric power.

Preferably, the boost module 630 is co-located with the auxiliary power module 640, and they are arranged electrically in parallel between HV+ 614 and HV− 616. This provides an efficient, low-power device that enables flexibility of overnight charging and/or long term storage protection of the HV battery 620 employing a low-power AC/DC adapter 660.

The low-voltage connector 650 provides external electrical connections to the second low-voltage DC power line 636 and the first low-voltage power line 637 of the high-voltage battery assembly 610. The first low-voltage DC power line 637 of the high-voltage battery assembly 610 electrically connects to line 664 of the low-power AC/DC adapter 660. The second low-voltage DC power line 636 of the high-voltage battery assembly 610 electrically connects to line 662, which electrically connects to the on-vehicle low-voltage battery 655.

The low-power AC/DC adapter 660 transforms AC power to DC power that is supplied via line 664 to a connector that mates with the low-voltage connector 650. In certain embodiments, the low-power AC/DC adapter 660 transforms 120V AC electric power that is supplied from an electrical outlet 65 to 12V DC electric power. The low-power AC/DC adapter 660 may connect to the low-voltage battery 655 via independent line 663, which may also connect to the third low-voltage power line 644. The 12V DC electric power supplied by the low-power AC/DC adapter 660 may be employed to electrically charge the high-voltage battery assembly 610 via the boost module 630 and also charge the on-vehicle low-voltage battery 655. This arrangement permits low-voltage charging of the HV battery 620 and the low-voltage battery 655.

The embodiments of the high-voltage battery assembly described with reference to FIGS. 1 and 3 through 6 provide a system for electrically charging a HV battery employing a low-power AC/DC adapter. Such configurations provide robust, economical and seamless systems for long term vehicle storage and convenient low-power charging with safety redundancy and diagnostic ability for both the HV and LV battery systems. The system employs a common high voltage rail on the HV Bus while providing independent HV switchgear on the opposite rail. The pre-charge circuit is placed on the common side rail allowing for independent HV branch power-up. This allows for the flexibility of combining inverter/converter modules where needed while reducing redundant relay cycling, HV sensing, and power electronic life as well as reducing vehicle mode switching times. The parallel combination of an auxiliary power module co-located with a boost module provides an efficient, low-power device providing the driver the flexibility of overnight charging and/or long term storage protection of the on-vehicle HV battery system. Such systems provide battery low-voltage battery charging while minimizing HV hardware, reducing diagnostic complexity, and maintaining available charging modes while increasing or maintaining vehicle availability. This also may provide diagnostic redundancy and maintain system reliability while allowing for flexibility to execute a lower power high voltage boost system.

The system described herein provides three robust modes of charging disconnection via the low-voltage switch, power to boost control and a main contactor. Low-voltage battery charge maintenance is decoupled from HV battery charge maintenance yet both are not mutually exclusive in operation in certain embodiments. High-voltage charging and LV charging may occur simultaneously with onboard control of charging. Alternatively, sequential HV charging and LV charging may occur with onboard control of charging. Furthermore, an operator may effect long-term battery maintenance of the high-voltage battery and the low-voltage battery employing an off-board AC/DC charging module that has a single connector electrically coupled to the battery.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A high-voltage battery assembly for a hybrid vehicle, comprising:
   a high-voltage battery electrically connected to a high-voltage bus including a positive rail and a negative rail, wherein the negative rail includes a controllable contactor switch;
   a boost charging module including a DC-DC boost converter, a low-voltage power input line, a boost switch and a boost controller, wherein the DC-DC boost converter is electrically connected to the low-voltage power input line via closing of the boost switch, wherein the DC-DC boost converter includes an electric power output line, and wherein the electric power output line is electrically connected to the positive rail of the high-voltage bus;
   an auxiliary power module including an input power line electrically connected to the positive rail of the high-voltage bus and an output power line electrically connected to a low-voltage on-vehicle battery; and
   a low-voltage electrical connector electrically connected to the low-voltage power input line of the DC-DC boost converter,
   wherein the boost controller includes an instruction set, the instruction set executable to:
      detect presence of low-voltage power on the low-voltage power input line supplied from the low-voltage electrical connector,
      detect that the controllable contactor switch of the negative rail is in an open state,
      close the boost switch,
      control the DC-DC boost converter to convert the low-voltage power on the low-voltage power input line to high-voltage power to charge the high-voltage battery, and
      control the auxiliary power module to convert the high-voltage DC power to low-voltage DC power to electrically charge the low-voltage on-vehicle battery.

2. The battery assembly of claim 1, wherein the auxiliary power module is a one-directional DC/DC converter wherein electric power only flows from high-voltage DC electric power to low-voltage DC electric power.

3. The battery assembly of claim 2, wherein the negative rail of the high-voltage bus is common for the boost charging module and the auxiliary power module.

4. The battery assembly of claim 1, further comprising a power inverter module electrically connected to the high-voltage bus.

5. The battery assembly of claim 1, wherein the instruction set executable to detect that the controllable contactor switch of the negative rail is in an open state comprises the instruction set executable to detect that the hybrid vehicle is in a key-off condition.

6. The battery assembly of claim 1, wherein the low-voltage power input line of the DC-DC boost converter is supplied electric power from a low-voltage electrical connector electrically connected to an off-board AC/DC charging module.

7. A high-voltage battery assembly for a vehicle, comprising:
   a high-voltage battery electrically connected to a high-voltage bus including a positive rail and a negative rail, wherein the negative rail includes a controllable contactor switch;
   a boost charging module including a DC-DC boost converter, a low-voltage power input line, a boost switch and a boost controller; and
   a low-voltage electrical connector electrically connected to the low-voltage power input line of the DC-DC boost converter; and
   an auxiliary power module including an input power line electrically connected to the positive rail of the high-voltage bus and an output power line electrically connected to a low-voltage on-vehicle battery;
   wherein the DC-DC boost converter is electrically connected to the low-voltage power input line via closing of the boost switch;
   wherein the DC-DC boost converter includes an electric power output line;
   wherein the electric power output line is electrically connected to the positive rail of the high-voltage bus;
   wherein the low-voltage power input line of the DC-DC boost converter is electrically connected via a low-voltage electrical connector to an off-board AC/DC charging module; and wherein the boost controller includes an instruction set, the instruction set executable to:
detect presence of low-voltage power on the low-voltage power input line supplied via the low-voltage electrical connector,
detect that the controllable contactor switch of the negative rail is in an open state,
close the boost switch,
control the DC-DC boost converter to convert the low-voltage power on the low-voltage power input line to high-voltage power to charge the high-voltage battery, and
control the auxiliary power module to convert the high-voltage DC power to low-voltage DC power to electrically charge the low-voltage on-vehicle battery.

8. The battery assembly of claim 7, wherein the auxiliary power module is a one-directional DC/DC converter wherein electric power only flows from high-voltage DC electric power to low-voltage DC electric power.

9. The battery assembly of claim 8, wherein the negative rail of the high-voltage bus is common for the boost charging module and the auxiliary power module.

10. The battery assembly of claim 7, further comprising a power inverter module electrically connected to the high-voltage bus.

11. The battery assembly of claim 7, wherein the instruction set executable to detect that the controllable contactor switch of the negative rail is in an open state comprises the instruction set executable to detect that the vehicle is in a key-off condition.

12. A method for charging a battery, comprising:
electrically connecting a high-voltage battery via a high-voltage bus including a positive rail and a negative rail to a boost charging module including a DC-DC boost converter including a boost switch and a boost controller;
electrically connecting a low-voltage power input line to an input line of the DC-DC boost converter;
electrically connecting a high-voltage power input line between an output line of the DC-DC boost converter and the positive rail of the high-voltage bus;
electrically connecting a low-voltage electrical connector to the low-voltage power input line of the DC-DC boost converter;
electrically connecting an auxiliary power module including an input power line to the positive rail of the high-voltage bus and an output power line electrically connected to a low-voltage on-vehicle battery;
detecting, via the boost controller, a presence of low-voltage power on the low-voltage power input line;
detecting that a controllable contactor switch of the negative rail is in an open state;
closing the boost switch;
charging the high-voltage battery by controlling the DC-DC boost converter to convert the low-voltage power on the low-voltage power input line to high-voltage power; and
charging the low-voltage on-vehicle battery by controlling the auxiliary power module to convert the high-voltage DC power to low-voltage DC power.

* * * * *